United States Patent Office 3,341,526
Patented Sept. 12, 1967

3,341,526
ACYLOXYACETALS OF FLUORO-16α-HYDROXY-PREDNISOLONES
Bo Thuresson Af Ekenstam, Molndal, and Bror Gösta Pettersson, Karlskoga, Sweden, assignors to Aktiebolaget Bofors, Bofors, Sweden, a Swedish company
No Drawing. Filed Jan. 12, 1965, Ser. No. 425,048
4 Claims. (Cl. 260—239.55)

The present invention relates to acyloxy acetals of cortisone derivatives.

More particularly, it is directed to the acetol [1-hydroxy-2-propanone] acetals of prednisolones, especially the mono- and di-fluoro-16α-hydroxyprednisolones containing fluorine in the 9α, and 6α and 9α-positions, respectively.

It was previously known to be possible to form acetals of cortisone derivatives in which the carbon atoms Nos. 16 and 17 each have a hydroxyl group. The acetals formed are stable. Of the previously known acetals, some have been whole acetals, which were produced by interaction with aliphatic and cycloaliphatic aldehydes and ketones, such as acetone, methylethylketone and cyclohexanone. The acetals so produced have anti-inflammatory properties. Of the known acetals, those which were formed by interaction of the steroid with dimethylketone have had the best effect.

The present invention is an improvement on the known acetals (formed by the interaction of the steroid with dimethylketone). According to the invention, acyloxyalkylketones in which the two alkyl groups consist of lower alkyls containing particularly 1 to 2 carbon atoms are substituted for the dimethylketone.

The compounds according to the present invention are shown by the following basic formulation of the pregnane nucleus having the instant 16, 17 acetal structure:

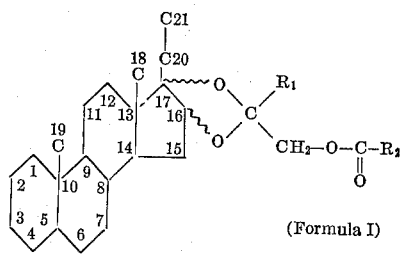

(Formula I)

in which each of $R_1$ and $R_2$ is an alkyl group having 1 or 2 carbon atoms.

The compounds are produced in accordance with the following reaction scheme:

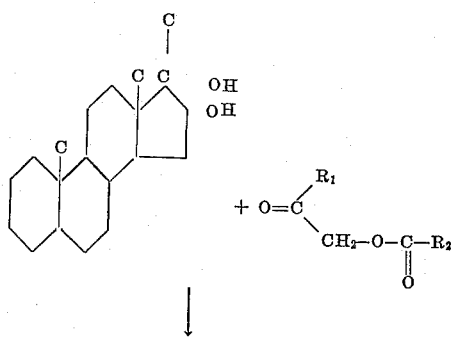

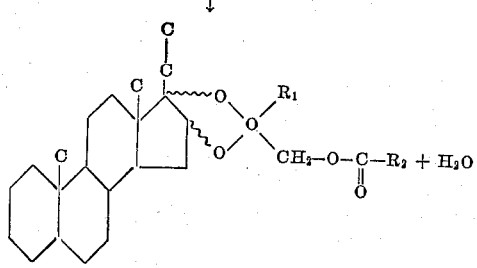

The compounds according to the present invention can be used either externally or internally.

A compound according to the present invention, viz., the acetoxymethylmethylketone acetal of a cortisone derivative, 9α-fluoro-16α-hydroxyprednisolone, has been found, in investigations according to the double blind method on humans, to have a considerably greater effect than other known acetals of cortisone derivatives. In determining the antiphlogistic effect, the compound, in accordance with the invention, was compared with triamcinolone acetonide as the control.

The concentration of the two substances (the substance tested and the control) was 0.025%. The following scale was used in evaluating the effect:

+ + + corresponds to 4,
+ + corresponds to 3,
± corresponds to 2,
− corresponds to 1, and
= corresponds to 0.

The compound according to the foregoing evaluation received 104 points, whereas the known substance (the control) received 87 points. The compound in accordance with this invention has an $LD_{50}$ value of 700 mg./kg. while the known compound has a corresponding value of 250 mg./kg.

The compound according to the present invention can be used in the form of ointments, creams, gels, tablets, spirit solution or any of the other customary pharmaceutical forms, the concentration of the compound therein being suitably chosen, and suitably ranging from 0.02 to 0.05 percent, by weight. The pharmaceutical composition is recommended to application for external use in treatments of dermatoses, and because of this the amount of the composition is depending upon the actual area of the skin lesion. The doses of the composition can be applied in at least the same amount as known pharmaceutical preparations as for example triamcinolone acetonid. When the preparation is used in form of an ointment it should be applied as a thin layer on the skin 2–3 times daily.

The following are examples in accordance with this invention:

EXAMPLE 1

*9α-fluoro-16α-hydroxyprednisolone-acetol acetate acetal*

A mixture of 300 cc. of dioxane (well dried), 100 g. of acetol acetate and 20 g. of 9α-fluoro-16α-hydroxyprednisolone, acidified with 1.6 cc. of 70% perchloric acid, was stirred for 20 hours, the temperature being elevated from 20° C. to a maximum of 30–35° C., to effect interaction of the streoid with the acetol acetate.

The pH of the reaction mixture was adjusted to pH 6 with 150 cc. of a 5% solution of sodium bicarbonate.

The volume of the reaction mixture was reduced by one-half through evaporation under vacuum. Upon the addition of 600 cc. of double-distilled water, the 9α-fluoro-16α - hydroxyprednisolone-acetol acetate precipitated in the form of an oil. The oil was dissolved in approximately 200 cc. of isopropanol, then treated with activated carbon, following which the mixture was filtered and evaporated to dryness. The resultant acetal was dried in a desiccator for 12 days, during which time it crystallized. The melting point is somewhat broad, as it is for most acetonides, and was found to range from 130–145° C. The yield was 80%.

EXAMPLE 2

*6α-9α-difluoro-16α-hydroxyprednisolone-acetol acetate acetal*

This compound was prepared in accordance with the procedure described in Example 1, when fluocinolone (6α-9α-difluoro-16α-hydroxyprednisolone) is used in lieu of the 9α-fluoro-16α-hydroxyprednisolone of Example 1.

The fluocinolone acetol acetate acetal was obtained, in the form of an oil, in the same yield.

It will be understood that the foregoing description of the invention and the examples set forth are merely illustrative of the principles thereof. Accordingly, the appended claims are to be construed as defining the invention within the full spirit and scope thereof.

We claim:

1. A compound of the formula

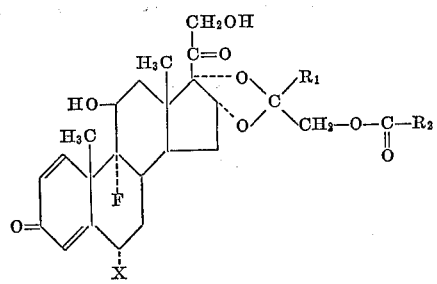

wherein $R_1$ and $R_2$ are selected from the group consisting of methyl and ethyl and X is hydrogen or fluoro.

2. A compound selected from the group consisting of:
   (1) 9α-fluoro-16α - hydroxyprednisolone-acetate acetate acetal and
   (2) 6α-9α-difluoro-16α - hydroxyprednisolone - acetol acetate acetal.

3. 9α-fluoro - 16α - hydroxyprednisolone-acetate acetal.

4. 6α-9α-difluoro-16α-hydroxyprednisolone-acetol acetate acetal.

References Cited
UNITED STATES PATENTS 3,048,581   8/1962   Fried _____ 260—239.55

LEWIS GOTTS, *Primary Examiner.*

H. A. FRENCH, *Examiner.*